(12) United States Patent
Chiang Wei Yin et al.

(10) Patent No.: US 7,366,240 B2
(45) Date of Patent: Apr. 29, 2008

(54) DECODER AND METHOD OF DECODING USING PSEUDO TWO PASS DECODING AND ONE PASS ENCODING

(75) Inventors: Patricia Chiang Wei Yin, Singapore (SG); Lucas Y. W. Hui, Singapore (SG); Jean-Michel Bard, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 780 days.

(21) Appl. No.: 10/801,983

(22) Filed: Mar. 16, 2004

(65) Prior Publication Data

US 2004/0264580 A1   Dec. 30, 2004

(30) Foreign Application Priority Data

Mar. 17, 2003   (SG) .............................. 200301294-5

(51) Int. Cl.
*H04N 7/01* (2006.01)
*H04N 7/50* (2006.01)

(52) U.S. Cl. .................. 375/240.26; 375/240.02; 375/240.03; 375/240.2; 375/240.25

(58) Field of Classification Search .......... 375/240.03, 375/240.25, 240.26, 240.16, 240.02, 240.2
See application file for complete search history.

(56) References Cited

U.S. PATENT DOCUMENTS 5,307,143 A * 4/1994 Oh .............................. 348/488
5,489,944 A * 2/1996 Jo .......................... 375/240.03
5,557,332 A * 9/1996 Koyanagi et al. ....... 375/240.16
5,589,993 A * 12/1996 Naimpally .................... 386/81
5,754,698 A * 5/1998 Suzuki et al. ................ 382/232
5,802,226 A * 9/1998 Dischert et al. ............... 386/53
5,831,688 A * 11/1998 Yamada et al. ............. 348/699
5,907,374 A * 5/1999 Liu ......................... 375/240.26

(Continued)

FOREIGN PATENT DOCUMENTS

AU        199897618 A   *  5/1999
EP        1465430 A2    * 10/2004
WO        WO 9951036 A2 * 10/1999
WO        WO 0230582 A1 *  5/2002

OTHER PUBLICATIONS

Knuth, D. _The Art of Computer Programming_. Reading, MA, Addison-Wesley, 1973. pp. 295-299.*
Mitchel, J. L. et al. _MPEG Video Compression Standard_. Boston, Kluwer Academic Publishers, 1996. pp. 150-160.*

*Primary Examiner*—Mehrdad Dastouri
*Assistant Examiner*—David N Werner
(74) *Attorney, Agent, or Firm*—Lisa K. Jorgenson; Robert Iannucci; Seed IP Law Group PLLC

(57) ABSTRACT

A method of processing video frame data includes the steps of: receiving a video frame; partially decoding the video frame; fully decoding the video frame to produce macroblocks; determining video data parameters from the partially decoded video frame or both the partially and fully decoded video frame; and encoding the macroblocks based on the determined video data parameters to provide a compressed video frame for subsequent display.

38 Claims, 8 Drawing Sheets

U.S. PATENT DOCUMENTS

| | | | |
|---|---|---|---|
| 6,222,887 B1 * | 4/2001 | Nishikawa et al. | 375/240.26 |
| 6,243,495 B1 * | 6/2001 | Naveen et al. | 382/236 |
| 6,301,428 B1 * | 10/2001 | Linzer | 386/52 |
| 6,310,915 B1 * | 10/2001 | Wells et al. | 375/240.03 |
| 6,333,949 B1 * | 12/2001 | Nakagawa et al. | 375/240.16 |
| 6,377,628 B1 * | 4/2002 | Schultz et al. | 375/240.26 |
| 6,400,763 B1 * | 6/2002 | Wee | 375/240.16 |
| 6,542,546 B1 * | 4/2003 | Vetro et al. | 375/240.12 |
| 6,934,330 B2 * | 8/2005 | Sugiyama et al. | 375/240.03 |
| 2002/0067768 A1 * | 6/2002 | Hurst | 375/240.03 |
| 2002/0181595 A1 * | 12/2002 | Obata et al. | 375/240.25 |
| 2003/0215011 A1 * | 11/2003 | Wang et al. | 375/240.03 |

* cited by examiner

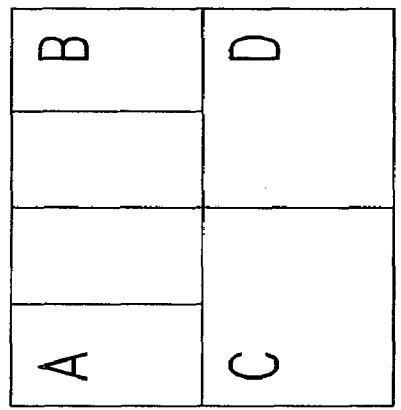
FIG. 5C  EQUAL OVERLAP ON 2 MACRO BLOCKS
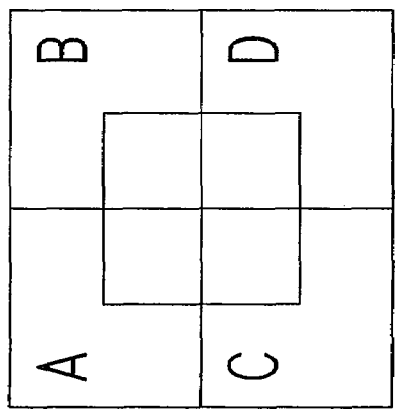
FIG. 5B  EQUAL OVERLAP ON ALL MACRO BLOCKS
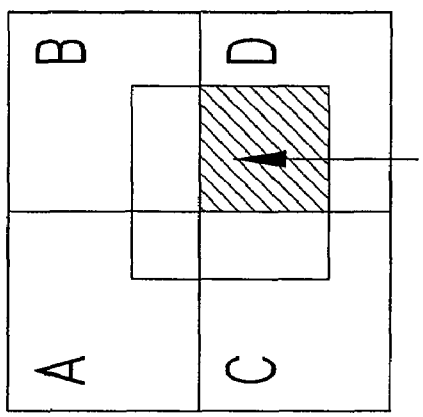
FIG. 5A  MAXIMAL OVERLAP

DECODER AND METHOD OF DECODING USING PSEUDO TWO PASS DECODING AND ONE PASS ENCODING

FIELD OF THE INVENTION

The present invention relates to a decoder and a method and system of video data decoding, and in particular the decoding of MPEG video bitstreams, that provides memory savings in frame buffers.

BACKGROUND OF THE INVENTION

There is a continuous need for reducing the memory requirements of a video decoder in order to reduce costs. However, it is also expected that the subjective quality of the decoded video will not deteriorate as a result. Memory reductions (for example in the ratio of 10:1 or higher) will also enable the effective embedding of memory components within a hardware decoder system component, similar to the embedded dynamic random access memory ("embedded DRAM") technology.

For example, a typical video decoder chip like an MPEG-2 decoder uses a significant amount of memory for storing the data in frame buffers to be used for decoding temporally linked video frames, video post-processing and for storing on-screen display information for feature enhancements. The reduction of memory requirements, especially in relation to video decoding and post-processing, has been the subject of much research since it can provide significant savings in manufacturing costs.

Memory reduction with decimation in the spatial domain causes blurring of the image while decimation in the frequency domain by applying a fixed bit rate to encode a macroblock or block, as suggested in the prior art, causes unpredictable artefacts which are especially apparent in fast moving video sequences.

Another challenge of recompression is the precision of bit rate control. Since the size of the physical memory to be used in a system may be fixed, the rate control of the variable-length encoding circuit (or entropy encoding) must be accurate, such that the maximum memory is utilized without exceeding the allocated memory size. Known methods such as virtual-buffer-fullness control may not be used independently since the variations in the generation of bits would not be ideal for a fixed and maximally utilised memory buffer. A tighter control of accuracy for the virtual-buffer-fullness method results in the degradation of picture quality, while better picture quality is associated with a high variation in the bit rate.

SUMMARY OF THE INVENTION

The present invention provides a method of processing video frame data, including the steps of:
(a) receiving a video frame;
(b) partially decoding the video frame;
(c) fully decoding the video frame to produce macroblocks;
(d) determining video data parameters from the partially decoded video frame or both the partially and fully decoded video frame;
(e) encoding the macroblocks based on the determined video data parameters to provide a compressed video frame for subsequent display.

In another aspect, the invention provides a video decoder adapted to perform the above method.

The present invention further provides a video decoder including:
(a) a bitstream parser for receiving a video frame;
(b) an embedded decoder for partially decoding the video frame and fully decoding the video frame to produce macroblocks;
(c) a data analyzer for determining video data parameters from the partially decoded video frame or both the partially and fully decoded video frame;
(d) an embedded encoder for encoding the macroblocks based on the determined video data.

To achieve a significant compression ratio while rendering acceptable picture quality and minimizing implementation complexity, the present invention provides a method of applying pseudo two-pass decoding and one-pass encoding of input video data. In the first pass of the two-pass decoding process, the input video bitstream is decoded partially to extract useful picture statistics for use in the subsequent one pass encoding process. The second pass of the two-pass decoding process is performed in parallel with the one-pass encoding process, which allows the storage of the decoded picture within a target-reduced amount of memory.

The preferred embodiment re-encodes each anchor frame (which may contain either an I-Picture or P-Picture) as an I-Picture to the desired memory compression ratio with minimum trade-off in picture quality and system complexity. Also, for cases where the display resolution is less than the bitstream resolution, a non-anchor picture (i.e. a B-Picture) can be decoded on-the-fly using a two-pass decoding technique to significantly reduce the overall memory requirements of the system.

In the case of a standard MPEG decoder, the one-pass encoding process takes the techniques of standard intra macroblock encoding with Discrete Cosine Transform ("DCT"), quantization, the scanning of DCT coefficients in a zig-zag pattern, and Variable-Length Coding ("VLC"). To minimise picture degradation and maximise the useful picture statistics that can be extracted during the first pass of the two-pass decoding process in the present invention for all frames, the one-pass encoding process used in a preferred embodiment utilises encoding techniques similar to that described for a standard MPEG encoder.

Embodiments of the invention also relate to a system for performing two-tiered rate control that re-compresses video data using present compression techniques. Based on the picture statistics derived from the first pass of the two-pass decoding process, the two-tiered rate control scheme is applied to the one-pass encoding process to determine the quantizer scale for efficient bit allocation. The determination of a suitable quantizer scale enables effective compression while maintaining good picture quality. Artefacts caused by the dropping of DCT coefficients during quantization are significantly reduced since decimation in the frequency domain is mostly performed within the ideal compression limit of the system, but rarely within the expansion range of the quantization process. Typically, the compression scheme supports a 10:1 memory reduction per frame buffer.

In addition, the rate control scheme is able to stabilise the bit rate generation of the compression scheme and maintain variations in the bit rate generally within 10% of the average bit rate. This rate control accuracy makes the present system suitable for use in systems with fixed memory buffers. Hence a video decoder with an embedded memory system may be built in accordance with the principles of the present invention.

BRIEF DESCRIPTION OF THE DRAWINGS

Preferred embodiments of the present invention are hereinafter described, by way of example only, with reference to the accompanying drawings, wherein:

FIG. 5A is a graphical representation of the normal case of maximal overlap of the predicted macroblock on the macroblock grid of compressed frame;

FIG. 5B is a graphical representation of the boundary case of equal overlap on 4 macroblocks;

FIG. 5C is a graphical representation of the boundary case of equal overlap on 2 of the 4 macroblocks;

DETAILED DESCRIPTION OF PREFERRED EMBODIMENTS OF THE INVENTION

Embodiments of the present invention are applicable to an MPEG-2 video decoder. The MPEG-2 specifications (also referred to as "ISO/IEC 13818") achieves significant compression by removing temporal redundancy between frames close in time. This is done in addition to removing spatial and statistical redundancy within a frame by DCT or entropy encoding and lossy compression by quantization. The temporal element implies that the encoding of a frame is not limited to information within the frame itself but information that may span across several pictures. In MPEG-2, the term "picture" refers to either a frame or a field. Therefore, a coded representation of a picture may be reconstructed into a frame or a field.

Figure 1:
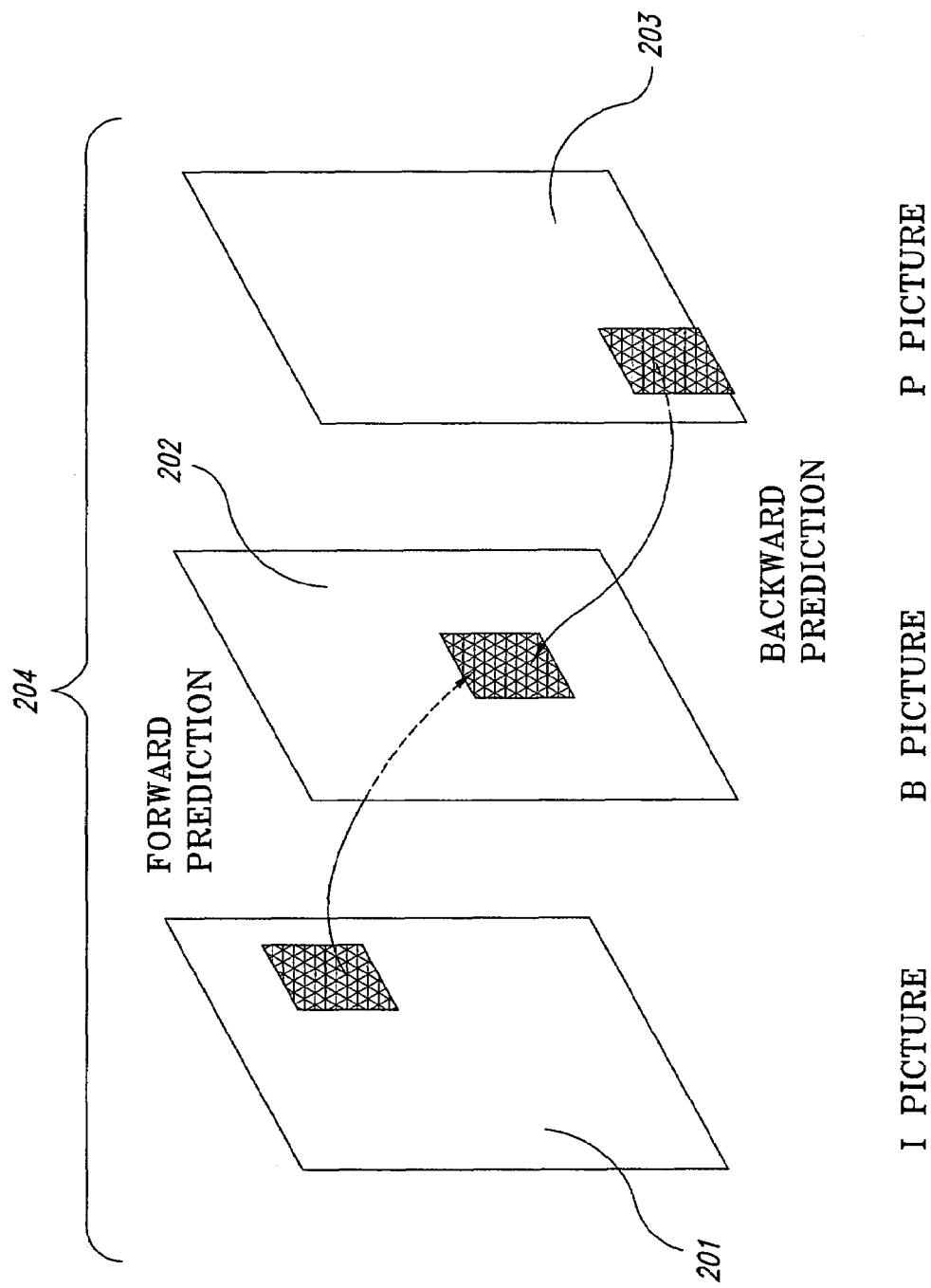
FIG. 1 is an illustration of the decoding of an interpolated macroblock in the B-Picture.

FIG. 1 illustrates an example of MPEG decoding of a macroblock in a B-Picture 202, which in this example requires forward prediction from an I-Picture 201 and backward prediction from a P-Picture 203. The sequence of frames 204 reflects the order in which the frames will be displayed, starting from the I-Picture 201. An I-Picture 201 (short for "intra picture") is encoded purely with information within the picture. A P-Picture 203 (short for "predicted picture") is encoded with information from an earlier I-Picture 201, or from an earlier P-Picture, in addition to information representing the current frame. A B-Picture 202 (short for "bidirectional picture") is encoded with information from both or either of an I-Picture 201 and P-Picture 203 to be displayed earlier and later than the current B-Picture 202. Even with "B-on-the-Fly" decoding, which involves the direct decoding of B-Picture bitstreams for display without intermediate storage, at least two anchor frames (i.e. an I-Picture or P-Picture) are required. Each anchor frame has a maximum size of approximately 5 megabits (derived by: 720 horizontal pixels×576 lines×1.5 bytes per pixel×8 bits per byte≈5 megabits) in the case of a PAL picture of D1 resolution.

It is desired to re-encode each anchor frame (i.e. an I-Picture or P-Picture) as an I-Picture to the desired memory compression ratio with minimum trade-off in picture quality and system complexity.

Figure 2:
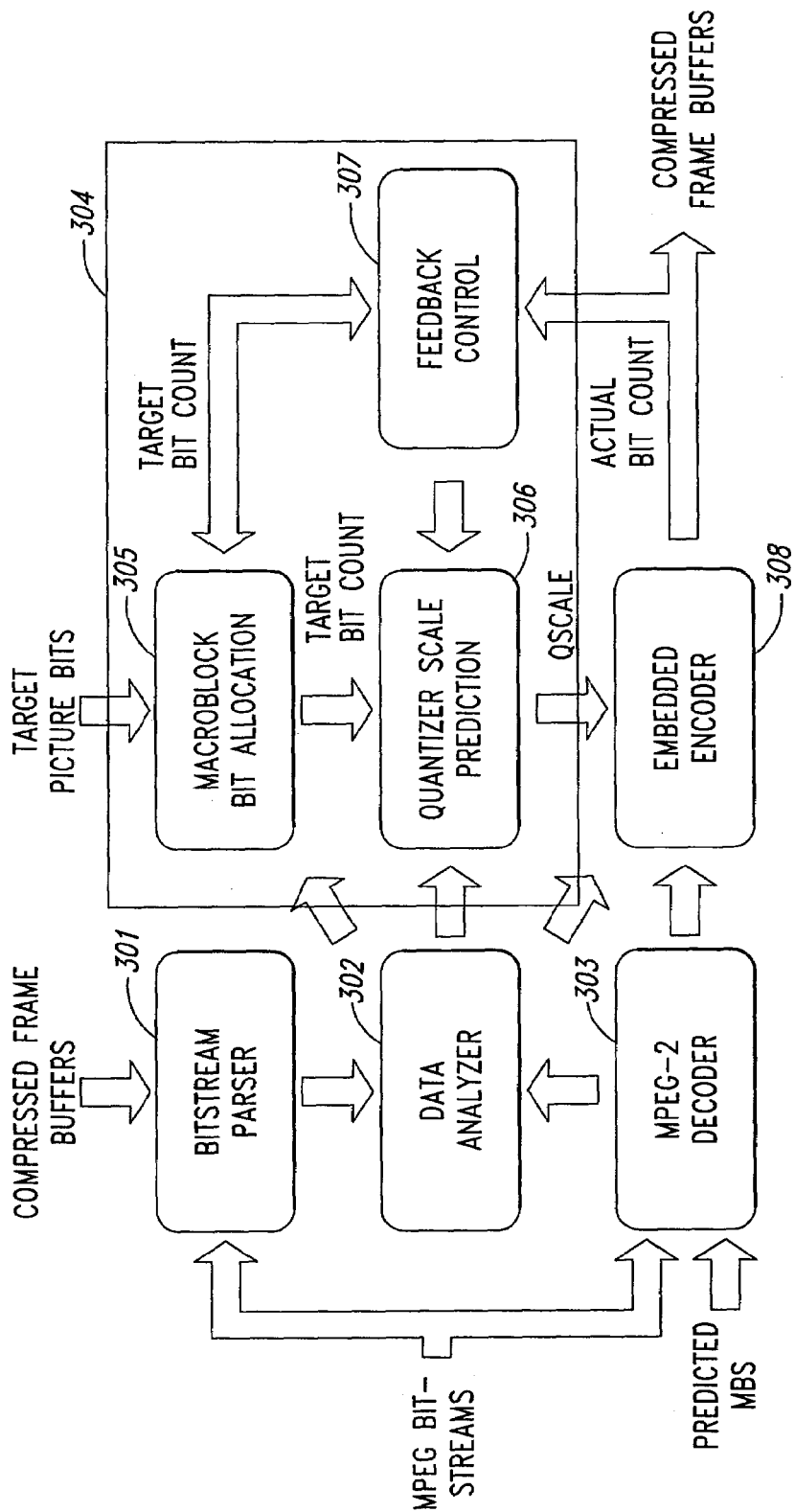
FIG. 2 is a flow diagram illustrating the interaction of various modules employed in a compression scheme of an embodiment of the present invention.

FIG. 2 shows the general operation of the memory reduction scheme in the decoder of a preferred embodiment. The MPEG video bitstream is partially decoded by a Bitstream Parser circuit 301, which applies variable-length decoding on the video bitstream to obtain the quantized DCT coefficients and macroblock information for all macroblocks and related picture information in each frame being processed. This is the first pass of the two-pass decoding process. The information from the partially decoded MPEG video bitstream is passed to a Data Analyzer circuit 302, which further extracts picture statistics and macroblock information in relation to each frame being processed. The Bitstream Parser 301 retrieves macroblock and picture information from the pictures stored in compressed frame buffers and the Data Analyzer circuit 302 uses this further macroblock information and picture statistics as described later.

An MPEG-2 Decoder circuit 303 completely decodes the MPEG video bitstream to produce macroblocks, which are later re-encoded by an Embedded Encoder 308 for storage in the compressed frame buffers and referenced by an address. The stored macroblocks may be later retrieved from memory for the motion compensation of predicted macroblocks, which may be decoded from later frames, thus forming the final pixel values in preparation for display. At the same time, macroblock information is passed to the Data Analyzer 302 as it is generated by the MPEG-2 Decoder 303. The Data Analyzer 30' uses more information from decoding (not shown) of the compressed frame buffers and computes important macroblock parameters (described below).

A rate control circuit 304 then uses the earlier computed picture statistics and macroblock parameters from the Data Analyzer circuit 302 to derive a suitable quantizer scale for the Embedded Encoder 308. A Macroblock Bit Allocation circuit 305 first allocates the target macroblock bits based on the scaled macroblock complexity. The bit allocation process allocates the number of bits to be used for encoding the AC coefficients of each macroblock using scaled macroblock complexity together with adjustments from a proportional and integral error feedback controller.

The equation governing the bit allocation process is given as follows:

$$s_i^T = \frac{\tilde{\chi}_i}{\tilde{\chi}_{pic}} * \left( s_{pic}^T + \eta e_{i-1} + \gamma \sum_{k=0}^{i-1} e_k \right)$$

where $s_i^T$ is the target number of bits for encoding AC coefficients for the $i^{th}$ macroblock;

$\tilde{\chi}_i$ is the estimated complexity for the $i^{th}$ macroblock;

$\tilde{\chi}_{pic}$ is the estimated complexity from current picture statistics;

$s_{pic}^T$ is the target bits for encoding all AC coefficients from current picture statistics;

$e_{i-1}$ is the number of bits for encoding the error of the AC coefficients for the $(i-1)^{th}$ macroblock;

$$\sum_{k=0}^{i-1} e_k$$

is the accumulation of the number of bits for encoding the error of the AC coefficients from the $0^{th}$ macroblock up to the $(i-1)^{th}$ macroblock;

η is the local proportional error feedback control constant, and

γ is the integral error feedback control constant.

For the present system the macroblock complexity, χ, is generally defined as:

$$\chi = s*q$$

where s is the number of bits used for encoding AC coefficients of a macroblock; and q is the quantizer scale used for the macroblock.

The process of scaled macroblock complexity bit allocation is developed on the finding that the macroblock complexity is relatively constant over a range of quantizer scales. A smaller quantizer scale generates more bits for encoding the AC coefficients of the same macroblock while a macroblock with higher complexity requires more bits for encoding its AC coefficients for the same quantizer scale.

The decoder differentiates between the number of bits generated by the AC and DC coefficients. As DC coefficients affect the contrast of the picture, it is critical that the recompression technique used in the Embedded Encoder 308 uses the same intra-DC precision and prevents any further loss of information. This differentiation also benefits the second process in the rate control scheme, known as the quantizer scale prediction.

A Quantizer Scale Prediction circuit 306 then predicts the corresponding quantizer scale to be used in encoding the AC coefficients of each macroblock using an inverse complexity relation with adjustments made by mismatch control. The equation governing the quantizer scale determination is given as follows:

$$\tilde{q}_i = \frac{\tilde{\chi}_i}{s_i^T} + \alpha e_{i-1} + \beta \sum_{k=0}^{i-1} e_k$$

where $\tilde{q}_i$ is the predicted quantizer scale for the $i^{th}$ macroblock;

$\tilde{\chi}_i$ estimated complexity of the $i^{th}$ macroblock;

$s_i^T$ is the target number of bits used for encoding AC coefficients for the $i_{th}$ macroblock;

$e_{i-1}$ is the number of bits for encoding the error of the AC coefficients for the $(i-1)^{th}$ macroblock;

$$\sum_{k=0}^{i-1} e_k$$

is the accumulation of the number of bits for encoding the error of the AC coefficients from the $0^{th}$ macroblock up to $(i-1)^{th}$ macroblock;

α is the local proportional error feedback control constant; and

β is the integral error feedback control constant.

In addition, normalization may be applied to the macroblock complexity, where the normalised macroblock complexity, $\hat{\chi}_i$, is given by:

$$\hat{\chi}_i = \frac{2*\tilde{\chi}_i + \overline{\chi}}{\tilde{\chi}_i + 2*\overline{\chi}}$$

where $\overline{\chi}$ is the average macroblock complexity of the previous re-encoded picture. Normalization is used to achieve better subjective quality and higher rate control accuracy. Normalized complexity reduces the differences between macroblock complexities, giving a higher rate control accuracy. In addition, high complexity regions are quantized coarser without subjective compromise, translating into bit savings for sensitive low complexity regions that are quantized finer, and thus achieving a better subjective quality.

Quantization comparison is made between the normalized and non-normalized macroblock complexity.

Figure 6:
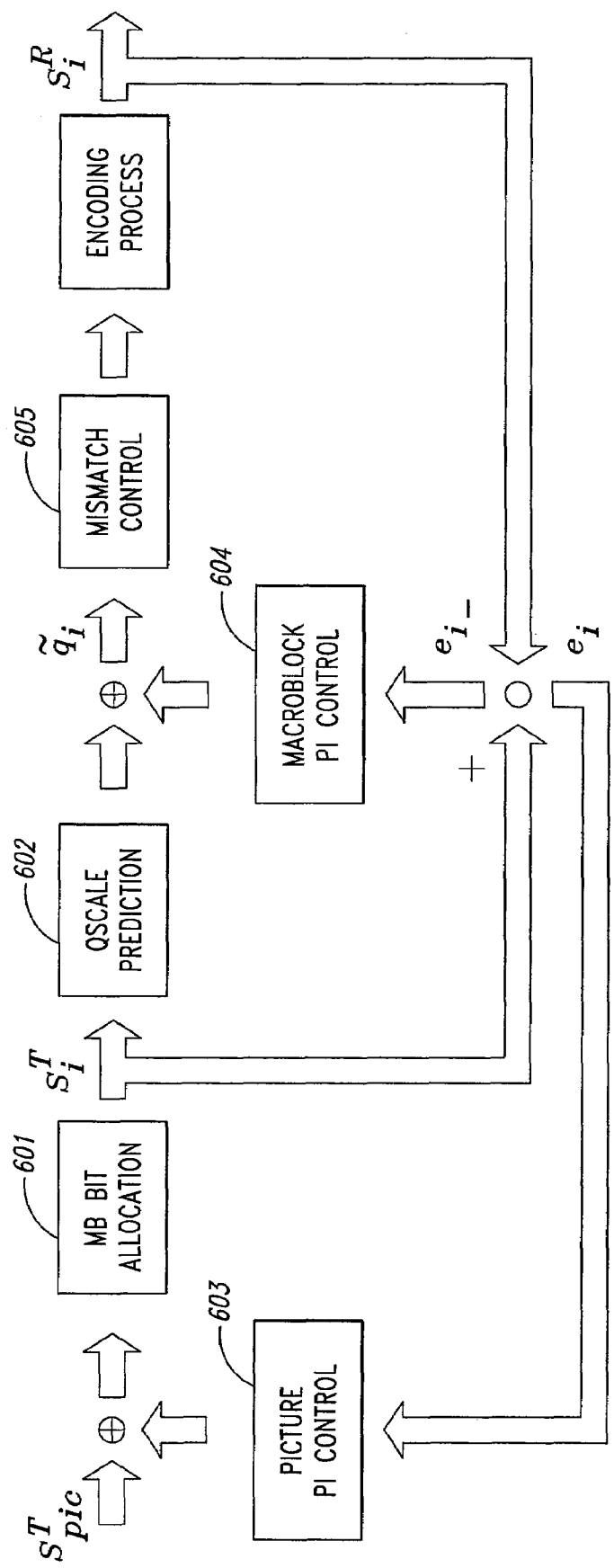
FIG. 6 is a block diagram of a rate control circuit according to an embodiment of the invention.

The rate control accuracy is guaranteed by a Feedback Control circuit 307 that implements a two-tier proportional integral ("PI") control loop (illustrated in FIG. 6). The inner loop tightly controls the quantizer scale prediction accuracy at the macroblock level, while the outer loop compensates for the offset created by the inner loop and converges the encoding bit count to the target picture bit count.

With the derived quantizer scale from the Rate Control circuit 304 and the encoding parameters from the Data Analyzer 302, the Embedded Encoder 308 encodes the stream of decoded pixel values from the MPEG Decoder 303 via the various video compression techniques in the MPEG-2 specifications, namely DCT, quantization and variable-length encoding, to form a video bitstream for storage in the compressed frame buffers.

Preferably, the Rate Control circuit 304 works in real-time, such that the Feedback Control circuit 307 receives the actual bit count of the video stream as it is leaving the Embedded Encoder 308 and makes any adjustments using the Macroblock Bit Allocation circuit 305 or Quantizer Scale Prediction circuit 306 for the next macroblock in the pipeline.

Figure 3:
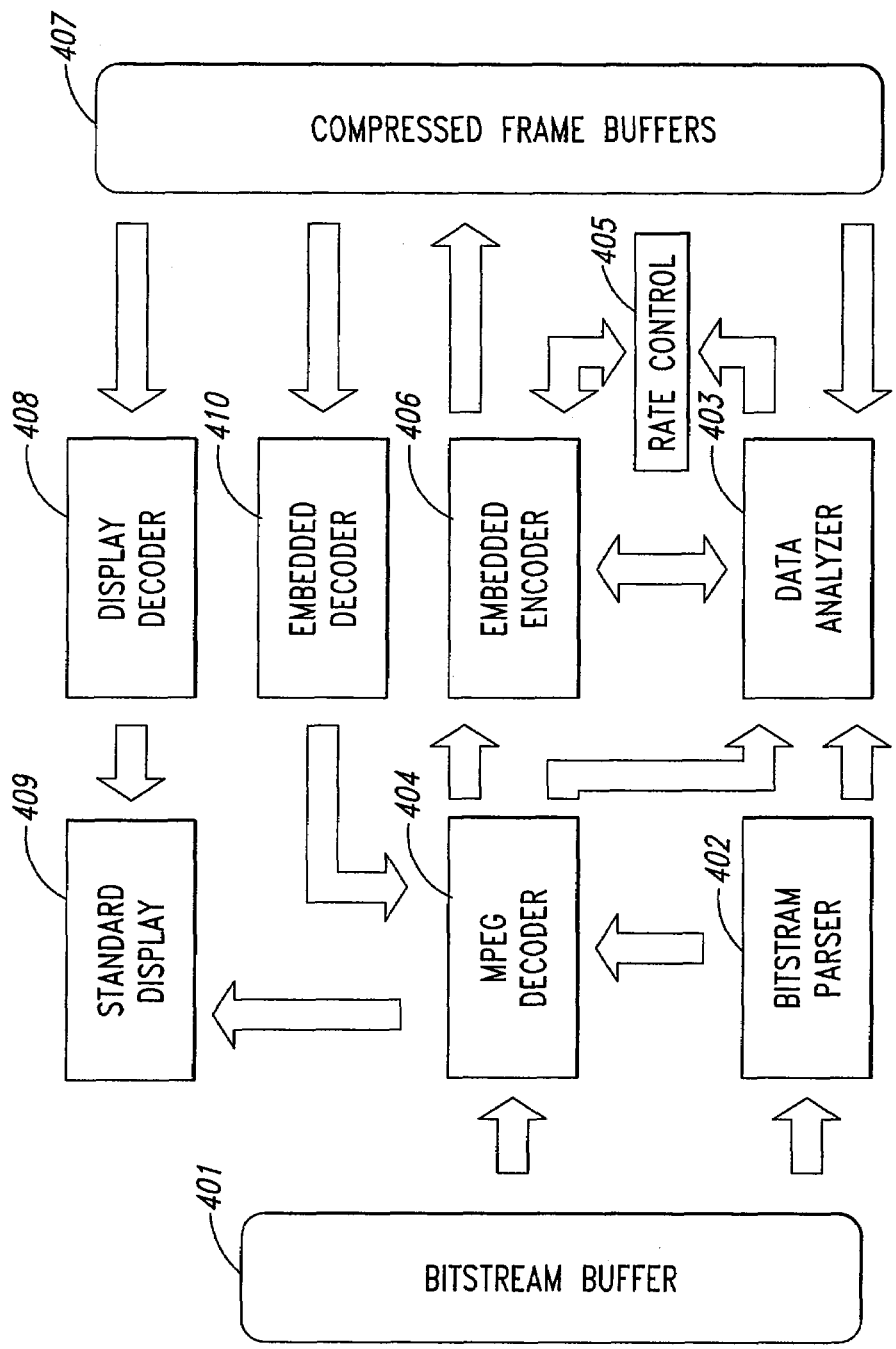
FIG. 3 is an example of an implementation architecture of a reduced memory video decoder of an embodiment of the present invention.

FIG. 3 shows an embodiment of the decoder, illustrating an example of an implementation architecture of B-on-the-Fly MPEG video stream decoding working in conjunction with a system providing reduced memory MPEG video stream decoding. To illustrate how the system operates, it is assumed that the system will process a MPEG-2 video bitstream consisting of frames in the display sequence {I, B, P, . . . }, with a corresponding frame encoding sequence of {I, P, B, . . . }. The video bitstream is received and stored in a Bitstream Buffer 401. After the required Video Buffering Verifier ("VBV") delay, as defined in the MPEG-2 specifications, the bitstream for the entire picture is stored in the Bitstream Buffer 401 and ready for decoding.

The decoding of each picture is performed by a pseudo two-pass decoding and one-pass encoding process, where the first phase of the two-pass decoding process, represented by a first field time of a frame to be processed, involves extracting macroblock and picture information and computing picture statistics (described below) for the current frame. The second phase of the two-pass decoding process (represented by a second field time of the frame to be processed) involves extracting macroblock information for the current frame and also the complete decoding of the current frame.

The second phase is performed in parallel with the one-pass encoding for the same frame. The encoded video data is then stored in compressed frame buffers 407.

In a first field time of the first frame, $t_1$, a Bitstream Parser 402 decodes the first I-Picture sufficiently for a Data Analyzer 403 to perform picture statistics computations. In a second field time of the first frame, $t_1$, a MPEG Decoder 404 decodes the first I-Picture completely and feeds forward information to the Data Analyzer 403 which computes macroblock characteristics. In the same time period, a Rate Control circuit 405 uses the computed parameters to determine a suitable quantizer scale. An Embedded Encoder 406 encodes the original I-Picture as a new I-Picture using the parameters from both the Data Analyzer 403 and the Rate Control circuit 405 at a macroblock latency relative to the MPEG Decoder 404. The final video bitstreams are stored in the Compressed Frame Buffers 407 and the address location of each macroblock in the Compressed Frame Buffer 407 is mapped into a Macroblock Pointer Table.

In a first field time of the second frame, $t_3$, the Bitstream Parser 402 decodes the P-Picture in the second frame sufficiently for the Data Analyzer 403 to perform picture statistics computations The decoding of the P-Picture is similar to I-Pictures except that the motion vectors are used to locate predicted macroblock properties, thereby providing a good estimate for the current inter-coded macroblock properties. Reference herein shall be made to a top-field first video image sequence. It is assumed that the processing of all video images begins from line 0, corresponding to the first line of an image. At the same time a Display Decoder 408 decodes the top field (or only the even-numbered lines) of the I-Picture retrieved from the Compressed Frame Buffers 407 and passes the decoded picture to the Standard Display 409 for further processing before it is displayed. In a second field time of the second frame, $t_4$, the operations of the P-Picture are similar to that for the I-Picture (i.e. it is encoded by the Embedded Encoder 406 as a new I-Picture and then stored in the Compressed Frame Buffers 407), except that the motion vectors of the P-Picture as decoded by the MPEG Decoder 404 are used to locate the corresponding predicted macroblocks in the Compressed Frame Buffers 407 using the Macroblock Pointer Table. The located reference macroblocks are retrieved and decoded by an Embedded Decoder 410, which operates concurrently with the MPEG Decoder 404 to produce the predicted pixel values for the motion compensated picture. In the case of I-Pictures, which has concealed motion vectors, a similar procedure like that for P-Pictures is followed. At the same time, the Display Decoder 408 decodes the bottom field (or only the odd-numbered lines) of the I-Picture from the Compressed Frame Buffers 407 and passes the decoded picture to a Standard Display 409 for further processing before it is displayed.

In a first field time of the third frame, $t_5$, the MPEG Decoder 404 decodes the video bitstream of the B-Picture in the Bitstream Buffer 401. However in the case of a B-frame picture, only macroblocks of selected motion vectors representative of the top field (i.e. only the even-numbered lines) are decoded. The motion compensated top field pixels are transmitted to the Standard Display 408 for further processing before the top field is displayed. A similar operation is performed to the bottom field (i.e. only the odd-numbered lines) during a second field time of the third frame, $t_6$. This method of direct decoding B-Picture bitstreams for display without requiring intermediate storage is known as "B-on-the-Fly".

The present invention only requires two anchor frames at any one time. Where a further anchor frame appears in the Group Of Pictures ("GOP") sequence, the new anchor frame is encoded as a new I-Picture and stored in the Compressed Frame Buffers 407 by replacing the earlier of the encoded I-Picture or P-Picture already stored in the Compressed Frame Buffers 407.

Figure 4:
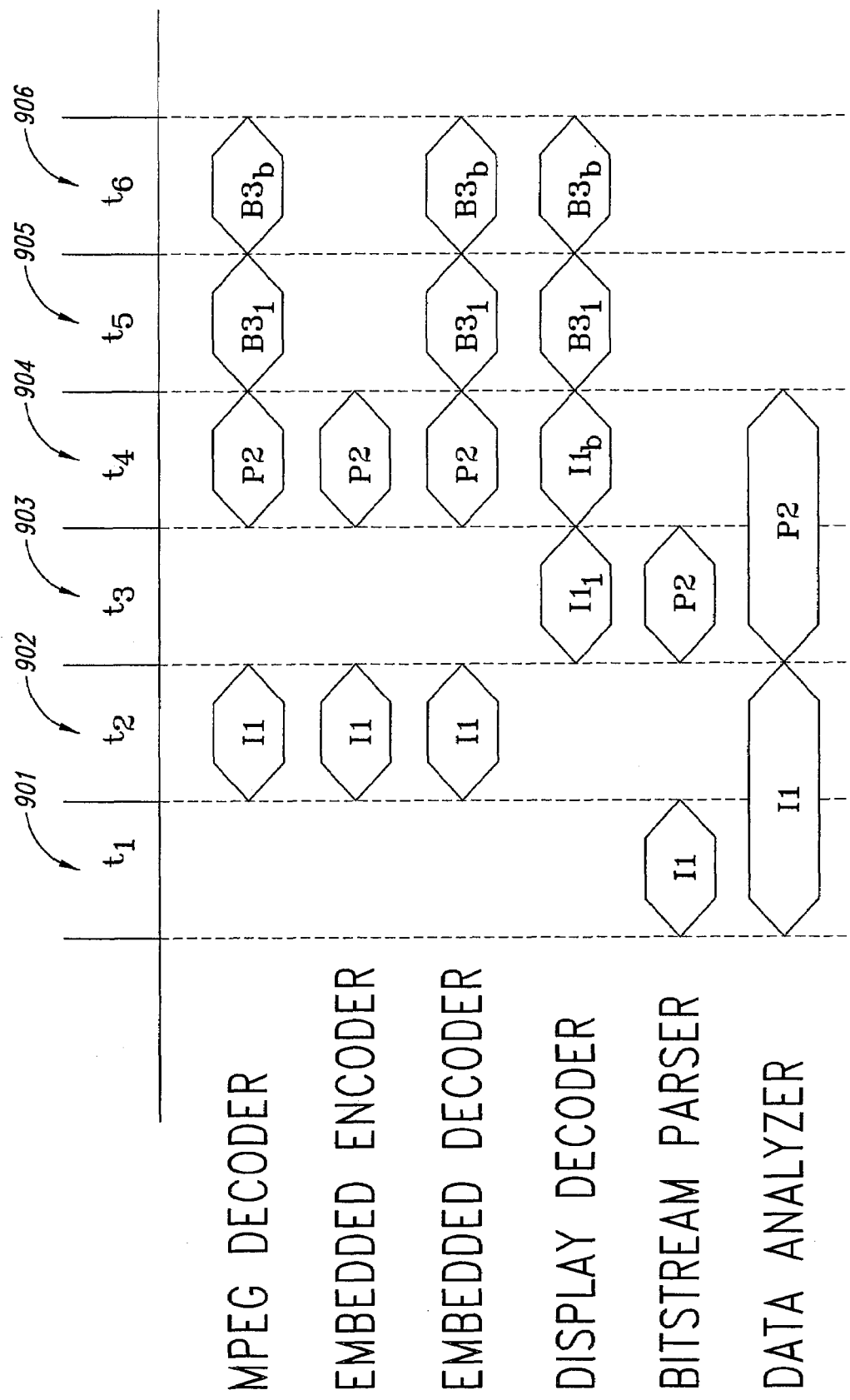
FIG. 4 is a timing diagram illustrating an example of how the present invention processes a MPEG-2 video bitstream with a frame encoding sequence of {I, P, B, . . . }.

FIG. 4 is a timing diagram illustrating an example of how the present invention processes a MPEG-2 video bitstream with a frame encoding sequence of {I, P, B, . . . }. The frame encoding sequence in this example also reflects the order in which the frames will be decoded. $t_1$ 901 is the first field time of the first frame, and represents the time interval in which the I-Picture in the first frame is decoded for picture statistics. $t_2$ 902 is the second field time of the first frame, and represents the time interval in which the I-Picture in the first frame is fully decoded and re-encoded as a new I-Picture before it is stored in the Compressed Frame Buffers.

$t_3$ 903 is the first field time of the second frame, and represents the time interval in which the P-Picture in the second frame is decoded for picture statistics. During the interval $t_3$, the top field of the I-Picture from the first frame, $I1_t$, is retrieved from the Compressed Frame Buffers and decoded by the Display Decoder in preparation for display. $t_4$ 904 is the second time field of the second frame, and represents the time interval in which the P-Picture in the second frame is fully decoded and re-encoded as a new I-Picture before it is stored in the Compressed Frame Buffers. During the interval $t_4$, the bottom field of the I-Picture from the first frame, $I1_b$, is retrieved from the Compressed Frame Buffers and decoded by the Display Decoder in preparation for display.

$t_5$ 905 is the first field time of the third frame, and represents the time interval in which the top field of the B-Picture in the third frame is decoded by the Embedded Decoder (by retrieving from the Compressed Frame Buffers only those macroblocks representing the top field of the current B-Picture, $B3_t$t, as defined by the motion vectors in the current B-Frame) and then decoded by the Display Decoder for mandate display. $t_6$ is the second time field of the third frame, and performs the same functionality described for $t_5$ but is applied in respect of the bottom field of the B-Picture in the third frame, $B3_b$.

During the first field time of an I-Picture or a P-Picture, the Bitstream Parser 402 variable-length decodes the video bitstreams after removing the numerous headers (including those headers that define a sequence, GOP, picture, slice, or macroblock) and extracts the following picture parameters for storage and macroblock parameters for further processing in Data Analyzer 403.

Picture Parameters:

q_scale_type, the type of quantization table used (linear or non linear);

Intra Quantizer Matrix, the two dimensional 8×8 quantization table used for intra-coding;

intra_DC_precision, the number of bits used for coding DC coefficients;

alternate_scan, the type of zig-zag scan to perform; and intra_vlc_format, the type of variable length coding table used for intra-coding.

Macroblock Parameters:

$s_i^b$, the bit count of AC coefficients;

$d_i^b$, the bit count of DC coefficients;

$q_i^b$, the quantizer scale;

$\{\{mv_k\}_{k=0}^{K-1}\}_i^b,$ the set of K full scale motion vectors decoded from the associated motion vector information; and mb_intra, the boolean representation of intra-coded macroblocks.

The parameters q_scale_type, intra_DC_precision, alternate_scan, intra_vlc_format and mb_intra are defined in the MPEG-2 Specifications.

Preferably, the macroblock parameters are processed in the Data Analyzer 403 as information is extracted from the Bitstream Parser 402 during the first pass decoding and the MPEG Decoder 404 during the second pass decoding. The Bitstream Parser 402 or the MPEG Decoder 404 might not give the exact list of parameters desired since some of the parameters have to be computed outside the MPEG Decoder 404. For example, the bit count of AC coefficients can be computed from the difference between the bitstream pointer from the first AC coefficient decoding to, and not inclusive of, the end of block code. In addition, some of the macroblock parameters are computed from the extracted parameters and some are accumulated to form picture parameters.

If the macroblock is intra-coded (i.e. if mb_intra=1), the estimated macroblock complexity, $\tilde{\chi}_i$, and the estimated bit count of DC coefficient, $\tilde{d}_i$, will be defined as follows:

$$\tilde{\chi}_i = s_i^b * q_i^b$$

$$\tilde{d}_i = d_i^b.$$

If the macroblock is inter-coded or if the prediction error is coded (i.e. if mb_intra=0), the estimated macroblock complexity, $\tilde{\chi}_i$, and the estimated DC coefficients bit count, $\tilde{d}_i$, will be defined as follows:

$$\tilde{\chi}_i = s_i^c * q_i^c$$

$$\tilde{d}_i = d_i^c.$$

where $s_c^i$, $q_i^c$ and $d_i^c$ are the bit count of AC coefficients, the quantizer scale and the bit count of DC coefficients respectively, as derived from the Compressed Frame Buffer 407. Statistical data are gathered from the Compressed Frame Buffers 407 rather than from the Bitstream Buffer 401 for inter-coded macroblocks, since the predicted macroblocks provide a closer image description to the original macroblock than the prediction error. The set of motion vectors, $\{\{mv_k\}_{k=0}^{K-1}\}_i^b,$ is used to locate the predicted macroblocks using the address references in the Macroblock Pointer Table.

For the equations in this specification, the b superscript represents information derived from the Bitstream Buffer 401 while the c superscript represents information from the Compressed Frame Buffers 407. Thus, for example, $\tilde{d}_i$ can be represented by $d_i^b$ or $d_i^c$, depending on whether the macroblocks to which $\tilde{d}_i$ relates are intra-coded or not (i.e. whether mb_intra=1 for those macroblocks).

Each macroblock is variable-length encoded and has a pointer reference to the start of the macroblock for easy reference in motion compensation. Reference herein is being made to a PAL picture (720 pixels×576 lines) of D1 resolution. A macroblock defines a two dimensional region consisting of a 16×16 pixel array in the video image. Each picture thus requires a Macroblock Pointer Table with a maximum of 1620 entries (where 45 macroblocks per line*36 macroblocks per column=1620 macroblock entries). A possible implementation with memory saving is to have a hierarchical pointer system implemented in the Macroblock Pointer Table. For example, the picture is divided into video segments, such that each video segment consists of five consecutive macroblocks. Each picture should have 324 full segment pointers (1620 macroblocks per picture/5 macroblocks per video segment=324 segments) and four incremental macroblock pointers per segment, where each incremental macroblock pointer points to a macroblock relative to the previous macroblock within that segment. Hence, for a 4:2:0 chroma sampling format, the largest macroblock size would be 3072 bits (8×8 pixels per block*6 blocks per macroblock*8 bits per pixel=3072 bits per macroblock) and the largest segment size would be 15,360 bits (3072 bits per macroblock*5 macroblocks per video segment=15,360 bits) and the largest picture size would be 4,976,640 bits (3072 bits per macroblock*1620 macroblocks per picture=4,976,640 bits). Assuming that the compression does not expand the original pixel data, a 12 and 23 bit precision is defined for an incremental macroblock pointer and a full segment pointer respectively. As a result, a minimum of 23,004 bits (324 segments per picture*(23 bits per full segment pointer+12 bits per incremental segment pointer*4 incremental segmental pointers per segment)=23,004 bits) is required to implement the Macroblock Pointer Table. Preferably, an 8×8 block pointer system that provides a finer resolution is not used since it requires an additional 9 bits per block (capped by the amount of uncompressed data per block) and amounts up to an additional 72,900 bits (9 bits per block*5 incremental block pointers per macroblock*1620 macroblocks per picture=72,900 bits) of memory.

By first identifying the segment, k, within which the macroblock, m, is located and each macroblock has a positional offset, n, it is possible to calculate the address of a predicted macroblock as follows:

$$\text{mb\_address}_m = \text{segment\_address}_k + \sum_{i=0}^{l-1} \text{mb\_address\_inc}_i$$

where mb_address$_m$ is the absolute macroblock address of macroblock m;

segment_address$_k$ is the full segment address of segment k, and mb_address_inc$_i$ is the incremental macroblock address of a macroblock with a position offset l within a segment k, and where l is an integer ranging from 0 to n−1 and n represents the number of macroblocks within a segment.

In contrast to the pixel resolution determined from the motion compensation scheme in a normal MPEG Decoder, macroblock resolution is used in the present decoder. Inter-coded macroblock properties are derived using motion vectors on the macroblock grid or a two dimensional boundary.

FIGS. 4A, 4B and 4C illustrate examples of a predicted macroblock on the macroblock grid. As shown in FIG. 5A, the predicted macroblock has a maximal overlap of pixels in macroblock D. The estimated macroblock complexity, $\tilde{\chi}_i$, and estimated bit count of intra-DC coefficients for the inter-coded macroblock, $\tilde{d}_i$, are defined as:

$$\tilde{\chi}_i = s_D^c * q_D^c$$

$$\tilde{d}_i = d_D^c.$$

where $s_D^c$, $q_D^c$, $d_D^c$ correspond to the bit count of AC coefficients, the quantizer scale and the bit count of DC coefficients respectively, as derived from a simple decoding of macroblock D from the Compressed Frame Buffers 407. As shown in FIG. 5B, if there is equal overlap on all macroblocks, any one of the four macroblocks will be used (for example macroblock D). As shown in FIG. 5C, if there is overlap on only 2 macroblocks, either one of the 2 macroblocks is used (for example macroblock B). A similar logic is applied at picture boundary conditions.

However in the case of multiple motion vectors, the average complexity, $\tilde{\chi}_i$, and the average bit count of DC coefficients, $\tilde{d}_i$, are taken over all motion vectors, and is represented by:

$$\tilde{\chi}_i = avg\{\chi_k^c\}_{k=0}^{K-1}$$

$$\tilde{d}_i = avg\{d_k^c\}_{k=0}^{K-1}$$

where $\chi_k^c$ and $d_k^c$ respectively correspond to the macroblock complexity and the bit count of DC coefficients derived, as defined above for the $k^{th}$ motion vector, from the set of motion vectors $\{mv\}_i^b$ and where K is the maximum number of motion vectors in the bitstream of a P-Picture according to the picture and motion prediction type, as tabulated in Table 1 below:

TABLE 1

| Picture Type | Prediction Type | K |
|---|---|---|
| Frame | Frame | 1 |
|  | Field | 2 |
|  | Dual Prime | 4 |
| Field | Field | 1 |
|  | 16 × 8 | 9 |
|  | Dual Prime | 2 |

A similar procedure is derived for skipped macroblocks in the P-Picture by setting K=1 and the corresponding motion vector=0.

Referring again to FIG. 3, the derived macroblock properties from the Compressed Frame Buffers 407 and the extracted macroblock properties from the Bitstream Parser 402 are accumulated at a macroblock level in Data Analyzer 403. These macroblock properties are as follows:

$$\tilde{X}_i = \sum_{j=0}^{i} \tilde{\chi}_j,$$

the accumulated complexity;

$$\tilde{S}_i^b = \sum_{j=0}^{i} \tilde{s}_j^b,$$

the accumulated bit count of AC coefficients from the Bitstream Parser;

$$D_i^b = \sum_{j=0}^{i} d_j^b,$$

the accumulated bit count of DC coefficients from the Bitstream Parser; and $$D_i^c = \sum_{j=0}^{i} d_j^c,$$

the accumulated bit count of DC coefficients from the Compressed Frame Buffers.

When the last macroblock N−1 of the picture has been reached, the picture complexity, $\chi_{pic}$, picture DC coefficients bit count from the Bitstream Parser 402, $D_{pic}^b$, and the picture DC coefficients bit count from the Compressed Frame Buffers 407, $D_{pic}^c$, are obtained as the result of accumulation. Other picture statistics are computed at the picture level by the equations below.

The bit count of a picture's DC coefficients is calculated as follows:

$$d_{pic} = D_{pic}^b * \lambda_{pic\_type} + D_{pic}^c$$

where $\lambda_{pic\text{-}type}$ is the estimated compression factor of the DC coefficients bit count in the previous picture of the same type as described below.

The target bit count of a picture's AC coefficients is calculated as follows:

$$s_{pic}^T = B_{pic}^T - \phi - d_{pic}$$

where $\phi$ is the overhead size (in bits) of the compression including the Macroblock Pointer Table, the quantizer_scale_code (a 5 bit parameter from the MPEG-2 Specification) and the dct_type (a 1 bit parameter from the MPEG-2 Specification) for all macroblocks in the picture, and where $B_{pic}^T$ is the target picture size. The quantizer scale is calculated from the quantizer_scale_code and q_scale_type. The dct_type represents either performing the discrete cosine transform in frame format or field format.

During the second field time of an I-Picture or P-Picture, the MPEG Decoder 404 decodes the MPEG video bitstream. During the full decoding process, the macroblock parameter dct_type$_i^b$ and all the above mentioned macroblock parameters (other than the bit count of DC coefficients from the Bitstream Parser 402, $d_i^b$) are extracted. dct_type$_i^b$ indicates whether frame IDCT or field IDCT was performed during the decoding process and is useful for encoding (such as in the Embedded Encoder 406). The extraction of the above mentioned macroblock parameters (other than the bit count of DC coefficients and the dct-type) during the first pass encoding for each macroblock is preferably repeated in the full decoding process (i.e. the second decoding process) so as to save buffer space for storing macroblock values, although it is not necessary for it to be repeated. Macroblock complexity may be computed again as described above for the Rate Control circuit 405. Additional parameters, like dct_type and min_qscale, are preferably derived in the full decoding process. However, these two parameters may be derived in the Bitstream Parser 402 during the first pass decoding and stored for use during the full decoding process.

min_qscale represents the minimum quantizer scale used and is relevant for the Mismatch Control circuit 605 (described later in the text) for controlling the minimum quantizer scale to be used for embedded encoding. If the quantizer scale used is lower than the min_qscale, then there is no value added because quantization with a parameter smaller than the original encoded stream in the Bitstream Buffer 401 does not produce a better image quality. The bits saved in the process can be used for storing other macroblocks.

For intra-coded macroblocks, $$\overline{dct\_type_i} = dct\_type_i^b$$
$$\overline{min\_qscale_i} = q_i^b$$

For inter-coded and skipped macroblocks, $$\overline{dct\_type_i} = dct\_type_i^c$$
$$\overline{min\_qscale_i} = min\_qscale_i^c$$

The $dct\_type_i^c$ and $min\_qscale_i^c$ parameters correspond to the dct type and minimum quantizer scale parameters respectively, and are derived from the Compressed Frame Buffers 407 using the set of motion vectors $$\{\{mv_k\}_{k=0}^{K-1}\}.$$

The c superscript represents information from the Compressed Frame Buffer 407.

For one motion vector $\{mv_0\}_i^b$ (with reference to FIG. 5A), $\overline{dct\_type_i}$ is the dct_type of macroblock D and $\overline{min\_qscale_i}$ is the minimum quantizer scale of the 4 or less macroblocks of interest. Both are derived as follows:

$$\overline{dct\_type_i} = dct\_type_D^c$$
$$\overline{min\_qscale_i} = \min\{q_j^b\}_{j=A}^D$$

Similar derivations can be done where there is an equal overlap (as shown in FIGS. 4B and 4C) and for picture boundary conditions.

In the case of K multiple motion vectors, $$\overline{dct\_type_i} = \begin{cases} default\_dct\_type & \sum_{k=0}^{K-1} dct\_type_k^c = K/2 \\ major\_dct\_type & otherwise \end{cases}$$

$$\overline{min\_qscale_i} = \min\{min\_qscale_k^c\}_{k=0}^{K-1}$$

where $dct\_type_k^c$ refers to the DCT type derived for the $k^{th}$ motion vector, which is derived in a similar way to the case for the one motion vector above; default_dct_type refers to a fixed dct_type value assigned for cases where equal numbers of motion vectors have the same dct_type; major_dct_type refers to the conformance to the majority of the dct_type that is derived by the set of motion vectors; and $\overline{min\_qscale_i}$ is the minimum min_qscale derived from the same set of motion vectors; and $min\_qscale_k^c$ refers to the minimum quantizer scale derived from the $k^{th}$ motion vector, which is derived in a similar way to the case for the once motion vector above.

In addition, referring to FIG. 3, Data Analyzer 403 updates two parameters (i.e. the default_dct_type and DC compression factor) at the picture level in the first or second field time for use in the subsequent pictures.

$$default\_dct\_type = \begin{cases} 1 & \sum_{i=0}^{N-1} \overline{dct\_type_i} > N/2 \\ 0 & otherwise \end{cases}$$

where N is the number of macroblocks in a picture and default_dct_type is the majority of dct_type used for the macroblocks in the picture.

The DC compression factor is calculated as follows:

$$\lambda_{pic\_type} = \frac{D_{pic}^{r/b}}{D_{pic}^b}$$

where pic_type is an I-Picture or P-Picture, $D_{pic}^b$ is the bit count of picture DC coefficients from the Bitstream Parser 402, and $D_{pic}^{r/b}$ is the bit count of picture DC coefficients from the re-encoded macroblocks that were intra-coded in the Bitstream Buffer 401. This compression factor is calculated for different picture types and may be used in the subsequent pictures of the same type. Typically, $\lambda_{pic\_type}$ can be initalized to 1.

With the picture and macroblock statistical information, the Rate Control circuit 405 derives a suitable quantizer scale for encoding. FIG. 6 shows a functional block diagram of the rate control scheme. A Macroblock Bit Allocation circuit 601 (shown as 305 in FIG. 2) allocates the number of bits to be used for encoding the AC coefficients of the macroblock according to scaled macroblock complexity which is defined as follows:

$$s_i^T = \frac{\tilde{\chi}_i}{\tilde{\chi}_{pic}} * (s_{pic}^T + \xi_{pic})$$

where $s_i^T$ is the target number of bits for encoding AC coefficients for the $i^{th}$ macroblock;
$\tilde{\chi}_i$ is the estimated complexity for the $i^{th}$ macroblock;
$\tilde{\chi}_{pic}$ is the estimated complexity from current picture statistics;
$s_{pic}^T$ is the target bits for encoding all AC coefficients from current picture statistics; and $$\xi_{pic} = \eta e_{i-1} + \gamma \sum_{k=0}^{i-1} e_k$$

is the proportional integral control adjustment for the picture level.

The Qscale Prediction circuit 602 (shown as 306 in FIG. 2) then predicts the quantizer scale with the following equation:

$$\tilde{q}_i = \frac{\tilde{\chi}_i}{s_i^T} + \xi_{MB}$$

where $\tilde{q}_i$ is the predicted quantizer scale for the $i_{th}$ macroblock;

$\tilde{\chi}_i$ estimated complexity of the $i^{th}$ macroblock;

$s_i^T$ is the target number of bits used for encoding AC coefficients for the $i^{th}$ macroblock; and $$\xi_{MB} = \alpha e_{i-1} + \beta \sum_{k=0}^{i-1} e_k$$

is the proportional integral control adjustment for the macroblock level.

To stabilize bit rate generation and improve rate control accuracy, a two-tier control closed loop is implemented. The error, $e_i = s_i^T - s_i^R$, defined as the difference between the target and re-encoded AC coefficient bit count, is fed back to outer and inner Proportional Integral (PI) control circuits 603 and 604 for the macroblock and picture level, respectively. The inner (macroblock) PI controller 604 compensates for the inaccuracies of the Qscale Prediction circuit 602 at the macroblock level and adds an error adjustment, calculated by $$\alpha e_{i-1} + \beta \sum_{k=0}^{i-1} e_k,$$

to the predicted quantizer scale, $\tilde{q}_i$, where $\alpha = -0.0008$ and $\beta = -0.0005$ are example constant values. These values are exemplary values only. The bounds of these values are related to the convergence of the control loop.

On the other hand, the outer (picture) PI controller 603 is concerned with the general stability of the bit rate generation and ensures the convergence of the target picture bit count. It adds an error adjustment, calculated by $$\eta e_{i-1} + \gamma \sum_{k=0}^{i-1} e_k,$$

to the target AC coefficient bit count before the scaled macroblock bit allocation takes place. In this case, example values can be $\eta = 0$ and $\gamma = 1.5$ since the impact of local error feedback is less than integral error feedback for stability purposes. These values are exemplary values only. The bounds of these values are related to the convergence of the control loop.

Mismatch control is performed by a Mismatch Control circuit 605 and is performed after the quantizer scale prediction and error adjustments. The objective is to match the discrete set of quantizer scale values defined by q_scale_type and quantiter_scale_code in the MPEG specifications. First the Mismatch Control circuit 605 performs saturation on the incoming quantizer scale, $\tilde{q}_i$, to the range of 2 to 62 for linear quantization (i.e. where q_scale_type=0), and to the range of 1 to 112 for non-linear quantization (i.e. where q_scale_type=1). Then the Mismatch Control circuit 605 rounds the saturated quantizer scale to a discrete quantizer scale value according to the linear and non-linear quantization table.

In addition, the Mismatch Control circuit 605 compares the discrete quantizer scale to the min_qscale variable and forces the quantizer scale to equate with the min_qscale variable if the quantizer scale is larger than the value of min_qscale. This is to ensure that the Embedded Encoder (shown as item 406 in FIG. 3) will encode with a quantizer scale no finer or smaller than its original quantizer scale as picture quality does not improve and encoding bits can be saved.

However for I-Pictures, if the estimated bit count of picture AC coefficients, calculated by $$\tilde{s}_{pic}^b = \sum_{j=0}^{N-1} s_j^b,$$

is less than the target bit count of picture AC coefficients, $s_{pic}^T$, the original quantizer scale, $q_i^T$, is used instead.

In an alternative embodiment, a slight adaptation involving $\hat{\chi}_i$ (or the normalized macroblock complexity) can be used instead of the macroblock complexity, $\chi_i$. The reason is that high complexity macroblocks have image details that are not compromised subjectively by using a coarser quantization step size, whereas low complexity macroblocks with smooth and homogenous areas that are more sensitive to the quantization step size and thus requires further quantization.

Normalized complexity is defined as follows:

$$\hat{\chi}_i = \frac{2 * \tilde{\chi}_i + \overline{\chi}}{\tilde{\chi}_i + 2 * \overline{\chi}}$$

where $\overline{\chi}$ is the average macroblock complexity of the previous re-encoded picture. Normalized complexity reduces the variation of macroblock complexity, raises the quantizer scale for higher complexity macroblocks and lowers the quantizer scale for low complexity macroblocks. The replacement of macroblock complexity, $\tilde{\chi}_i$, by the normalised complexity $\hat{\chi}_i$, in all above steps concerning rate control achieves the advantage of having better subjective quality and higher rate control accuracy.

Figure 7:
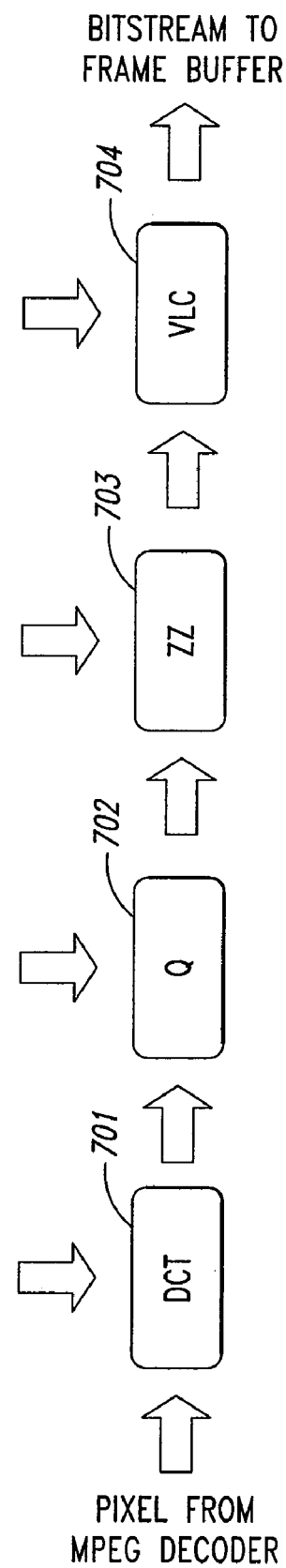
FIG. 7 is a block diagram of the embedded encoder module shown in FIG. 3.

The Embedded Encoder (shown as item 406 in FIG. 3) re-encodes all anchor frames (namely I-frames and P-frames) and all the components of the Embedded Encoder are shown in FIG. 7. A Discrete Cosine Transform (DCT) circuit 701 performs a two dimensional 8×8 DCT on the pixel output of the decoded video bitstream from the MPEG Decoder (shown as item 404 in FIG. 3). For a frame picture, a frame DCT is performed if the dct_type is determined to be 0 in the Data Analyzer (shown as item 403 in FIG. 3), otherwise a field DCT is performed. The resultant DCT coefficients are quantized by a Quantizer (Q) circuit 702 using the 8×8 intra-quantizer matrix from the Data Analyzer 403 and the derived quantizer scale from the Rate Control circuit (shown as item 405 in FIG. 3). The 8×8 quantized coefficients are then re-arranged in a zig-zag manner by a zig-zag (ZZ) circuit 703 according to the predetermined alternate_scan format parameter from the Data Analyzer 403. A Variable-Length Coder (VLC) circuit 704 subsequently variable-length encodes the one dimensional data in the chosen intra_vlc_format determined from the Data Analyzer 403 using run-length encoding and the Huffman table defined in the MPEG-2 specifications and also differential encoding of the luminance DC coefficients within the macroblocks. At the same time, the number of bits generated by the VLC circuit 704 is tracked and fed back to the Rate Control circuit 405.

The VLC circuit 704 also ensures minimal expansion of video data on a 8×8 block basis by limiting the maximum number of bits for an 8×8 block to 682 bits, or by dropping the last few coefficients if the limit is exceeded. The reason for this is that the macroblock pointer has a fixed precision of 12 bits and any expansion of data is inefficient on memory savings. Furthermore, limiting the bit count on the expanded data rate does not have an adverse effect on the picture quality. The entire encoding process is similar to the MPEG encoder except for the absence of the motion estimator, the decoding loop, motion vectors and MPEG conforming bitstreams. The components in Embedded Encoder 406 can be built from standard components in an MPEG Encoder.

Referring again to FIG. 3, as the bitstreams from the Embedded Encoder 406 are generated, they are stored into the Compressed Frame Buffers 407 and the Macroblock Pointer Table is updated with the new starting address of each macroblock. In the decoding of B-Pictures, anchors frames are required to provide the forward and backward prediction, giving rise to the need of at least two compressed anchor frames (I-frames or P-frames stored as I-Pictures) in the Compressed Frame Buffers 407. For example, with a 10:1 compression scheme, the capacity of the Compressed Frame Buffer 407 will be approximately equal to 1 megabits (calculated by 2 frames*0.1 being the compression factor*4, 976,640 bits per frame≈1 megabits).

Memory space may be shared between the Video Bitstream Buffer 401, the Compressed Frame Buffers 407, the Still Picture Buffer (not shown) and the On-screen Display Graphics Buffer (not shown). The Still Picture Buffer stores a compressed still picture from the bitstream that may be decoded as a background picture during run time. The On-screen Display Graphics Buffer stores graphics including texts and logos that are overlaid on screen for special features, for example the channel menu. The size of the Video Bitstream Buffer 401 varies with the video bitrate, with an upper limit determined by the maximum bit rate of the video bitstream. The size of the Compressed Frame Buffers may therefore be changed for every video bitstream or for the decoding of a particular bitstream according to application needs and memory availability. The number of bits for a picture may also be dynamically allocated for maximal picture quality.

Figure 8:
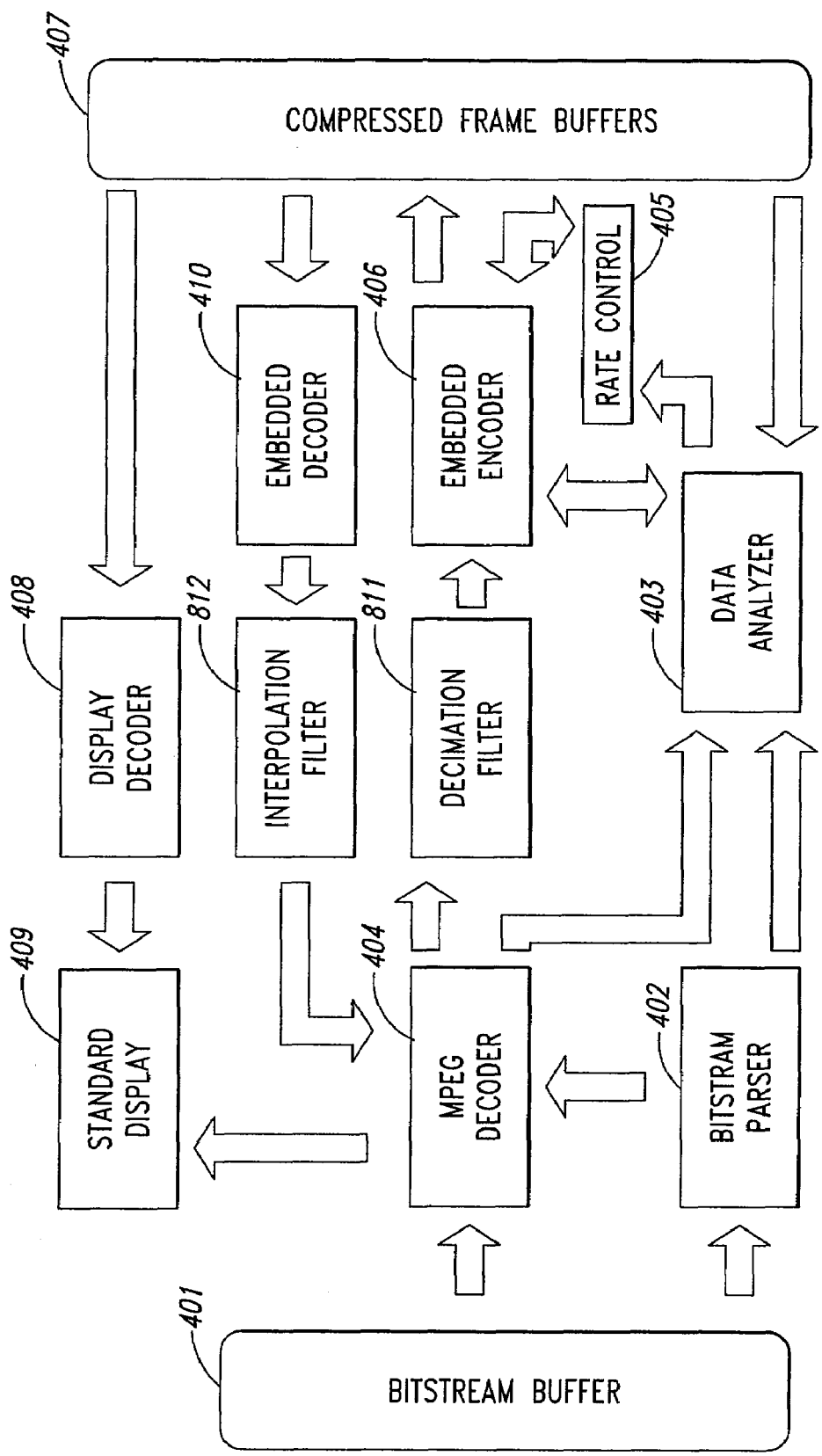
FIG. 8 is a block diagram of a decoder of another embodiment of the present invention that supports lower resolution picture or zoom-out picture decoding.

In an alternative embodiment, the present system may be extended to also perform lower resolution picture decoding. FIG. 8 shows a modified architecture of the detector to support lower resolution picture or zoom-out picture decoding. The architecture in FIG. 8 involves the inclusion of a Decimation Filter 811 and an Interpolation Filter 812. All other components in FIG. 8 have the same functionality as the correspondingly numbered components described in FIG. 3. The Decimation Filter Circuit 811 performs a horizontal spatial decimation of the display pixels to the required resolution using a digital decimation filter, for example a 7 tap filter with coefficients [−29, 0, 88, 138, 88, 0, −29] for a 2:1 decimation, before it is encoded by Embedded Encoder 406. The horizontally down-scaled version of the picture is stored as variable-length encoded bitstreams in the Compressed Frame Buffers 407 and is decoded when necessary for display by the Display Decoder 408.

An Interpolation Filter 812 is needed to perform a horizontal spatial interpolation to achieve full D1 resolution motion compensation using a digital interpolation filter, for example a 7 tap filter with coefficients [−12, 0, 140, 256, 140, 0, −12] for a 1:2 interpolation. The two filters can be designed jointly and filters for luminance and chrominance components can be customized to maximize picture quality. These filters are standard components of a video preprocessor subsystem in video related application systems.

Besides using the above filters, the Data Analyzer 403 may be adapted to support zoom-out modes where the D1 horizontal resolution is an integer multiple, θ, of a lower horizontal resolution picture. The adaptation includes additional analysis being performed once for every θ macroblocks decoded to compute corresponding parameters of the to-bo-displayed macroblock. Macroblock complexity and quantizer scale are averaged for θ macroblocks, the minimum min_qscale is selected among θ macroblocks and the majority dct_type for θ macroblocks is conformed to.

The bit counts of DC and AC coefficients (for I-Pictures), $\tilde{d}_i$ and $\tilde{s}_i^b$ respectively, are accumulated for every decoded macroblock as described in the earlier text. The bit count of the respective DC and AC coefficient in a picture (for I-Pictures) are calculated based on the to-be-displayed macroblock, as follows:

$$\tilde{d}_{pic} = \frac{1}{\theta}(D_{pic}^b * \lambda_{\text{pic\_type}} + D_{pic}^c)$$

$$\tilde{s}_{pic}^b = \frac{1}{\theta}\sum_{j=0}^{N-1} s_j^b$$

It is obvious to those skilled in the art that special considerations may be made for the picture boundary in the case where the width or height of the decimated picture is not an integer multiple of macroblocks.

To reduce speed complexity issues regarding the B-on-the-Fly decoding of B-Pictures for low resolution display, two extra picture buffers may be included as part of the system to temporarily store B-Pictures. As such, B-pictures may be compressed similar to the anchor frame pictures as described above. The size of the Compressed Frame Buffers 407 is not compromised as lower resolution pictures produce acceptable picture quality at a smaller target picture bit count.

Further simplification may be done to reduce decoding from a two-pass to a single-pass decoding process for B-Pictures. As such, the computation of the Data Analyzer 403 during the first field of decoding is eliminated and the macroblock bit allocation scheme in the Rate Control Circuit 405 is adapted to allocate a constant or averaged target bit count of AC coefficients, defined by:

$$s_i^T = \frac{s_{pic}^T}{N}$$

where N is the number of macroblocks in the low resolution picture, and the bit count of picture DC coefficients (and hence the target bit count of picture AC coefficients) may be estimated from the previous picture of the same type.

The term "circuit" as used herein with reference to functional components is intended to include any applicable hardware componentry which can accomplish the appropriate function and may include processor chips and ASICs as well as basic electronic logic components. The "circuits" may also be implemented as modules executed in software or a combination of software and hardware.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of processing video frame data, comprising the steps of:
   receiving a video frame;
   partially decoding the video frame;
   fully decoding the video frame to produce macroblocks;
   determining video data parameters from the partially decoded video frame or both the partially and fully decoded video frame; and
   encoding the macroblocks based on the determined video data parameters to provide a compressed video frame for subsequent display, wherein the determining step includes one or more of:
   (i) determining macroblock-level and picture-level video data parameters;
   (ii) determining macroblock complexity in the video frame;
   (iii) determining picture statistics of the video frame; and
   wherein said picture statistics include DCT type, DC compression factor, picture complexity, a picture bit count of AC coefficients, and a picture bit count of DC coefficients, wherein said picture bit count of DC coefficients is determined as the summed accumulation of bit counts of DC coefficients from intra-coded macroblocks multiplied by the DC compression factor and accumulation of estimated bit count of DC coefficients from the inter-coded macroblocks.

2. A method according to claim 1, wherein the step of partially decoding the video frame includes variable length decoding an input bitstream of the video frame data.

3. A method according to claim 2, wherein the step of partially decoding the video frame includes variable length decoding the input bitstream for an intra-coded video frame and variable length decoding a compressed anchor video frame bitstream for inter-coded video frames.

4. A method according to claim 3, further comprising storing the macroblocks in a memory, wherein variable length decoding the compressed anchor frame bitstream includes macroblock address decoding using a macroblock pointer table and the step of determining includes determining macroblock-level and picture-level video data parameters.

5. A method according to claim 4, wherein said macroblock pointer table is organized into video segments, each comprising n macroblocks with a full length segment pointer and n−1 incremental segment pointers, where n is an integer.

6. A method according to claim 4, wherein said macroblock address decoding is performed according to:

$$\text{mb\_address}_m = \text{segment\_address}_k + \sum_{i=0}^{l-1} \text{mb\_address\_inc}_i$$

where $\text{mb\_address}_m$ is the absolute macroblock address of macroblock m; $\text{segment\_address}_k$ is the full segment address of segment k; and $\text{mb\_address\_inc}_i$ is the incremental macroblock address of a macroblock with a position offset l within a segment k; and where l is an integer ranging from 0 to n−1 and n represents the number of macroblocks within a segment.

7. A method according to claim 1, wherein said macroblock-level video data parameters of step (i) include one or more of: an intra coding flag, a bit count of AC coefficients, a bit count of DC coefficients, a quantizer scale, motion vectors, and discrete cosine transform (DCT) type.

8. A method according to claim 1, wherein said picture-level video data parameters of step (i) include one or more of: quantizer scale parameters, intra quantization matrix parameters, intra DC precision parameters, alternate scan format parameters, and intra variable length coding format parameters.

9. A method according to claim 1, wherein the determining step includes estimating the set of macroblock parameters from compressed anchor frames using a decoded motion vector.

10. A method according to claim 9, wherein the step of estimating macroblock parameters from compressed anchor frames for inter-coded macroblocks includes one or more of:
    (iv) determining macroblock parameters including a bit count of AC coefficients, a bit count of DC coefficients and a quantizer scale;
    (v) determining a discrete cosine transform (DCT) type; and
    (vi) determining a minimum quantizer scale.

11. A method according to claim 10, wherein step (iv) is based on a maximal overlap principle where the macroblock assumes characteristics of a compensated macroblock that is maximally overlapped.

12. A method according to claim 10, wherein said determined DCT type is based on a majority of DCT types used in motion compensated macroblocks for inter-coded macroblocks.

13. A method according to claim 10, wherein said minimum quantizer scale is the minimum quantizer scale used among motion compensated macroblocks for inter-coded macroblocks.

14. A method according to claim 10, wherein the step of determining video data parameters from the partially decoded video frame includes step (iv) and the step of determining video parameters from the fully decoded video frame include steps (iv) to (vi), excepting determining said bit count of DC coefficient.

15. A method according to claim 10, wherein the step of determining video data parameters from the partially decoded video frame includes step (iv) and the step of determining video data parameters from the fully decoded video frame include steps (v) to (vi).

16. A method according to claim 10, wherein the step of determining video data parameters from the partially decoded video frame includes steps (iv) to (vi).

17. A method according to claim 1, wherein said macroblock complexity is determined as the product of the macroblock quantizer scale and the bit count of the AC coefficients of the macroblock.

18. A method according to claim 1, wherein said macroblock complexity is estimated from the product of an estimated quantizer scale and an estimated bit count of AC coefficients for inter-coded macroblocks.

19. A method according to claim 1, wherein the default DCT type is a fixed parameter value assigned where equal numbers of motion vectors have the same DCT type.

20. A method according to claim 1, wherein the DC compression factor is defined as a picture bit count of DC coefficients of the received video frame divided by a picture bit count of a DC coefficients from re-encoded macroblocks.

21. A method according to claim 1, wherein said picture complexity is determined as one of the sum of macroblock complexities of macroblocks in the video frame and the sum of estimated macroblock complexities of macroblocks in the video frame.

22. A method according to claim 1, wherein said picture bit count of AC coefficients is determined as one of the sum of macroblock bit counts of AC coefficients and the sum of estimated macroblock bit counts of AC coefficients.

23. A method according to claim 1, wherein the step of encoding the macroblocks includes:
(i) allocating target encoding bits for each macroblock;
(ii) predicting a quantizer scale for each macroblock;
(iii) implementing control loop feedback; and
(iv) encoding the macroblock based on said video data parameters.

24. A method of processing video frame data, comprising the steps of:
receiving a video frame;
partially decoding the video frame;
fully decoding the video frame to produce macroblocks;
determining video data parameters from the partially decoded video frame or both the partially and fully decoded video frame; and
encoding the macroblocks based on the determined video data parameters to provide a compressed video frame for subsequent display, wherein the step of encoding the macroblocks includes:
(i) allocating target encoding bits for each macroblock; (ii) predicting a quantizer scale for each macroblock; (iii) implementing control loop feedback; and (iv) encoding the macroblock based on said video data parameters, wherein the allocation of target macroblock encoding bits includes scaling of macroblock complexity relative to picture complexity with a feed back control adjustment, as described by the equation:

$$s_i^T = \frac{\tilde{X}_i}{\tilde{X}_{pic}} * (s_{pic}^T + \xi_{pic})$$

where $s_i^T$ is a target number of bits for encoding AC coefficients for an $i^{th}$ macroblock; $\tilde{X}_i$ is an estimated complexity for the $i^{th}$ macroblock; $\tilde{X}_{pic}$ is an estimated complexity from current picture statistics; $s_{pic}^T$ is a target number of bits for encoding all AC coefficients from current picture statistics; and $\zeta_{pic}$ is a proportional integral control adjustment for the picture level.

25. A method according to claim 24, wherein said predicted quantizer scale is constrained to be above a minimum quantizer scale.

26. A method according to claim 24, wherein $\zeta_{pic}$ is defined by $$\eta e_{i-1} + \gamma \sum_{k=0}^{i-1} e_k$$

where η and γ are constants and $e_i$ is an error of the $i^{th}$ macroblocks, defined as the difference between the target and re-encoded AC coefficient bit counts.

27. A method of processing video frame data, comprising the steps of:
receiving a video frame;
partially decoding the video frame;
fully decoding the video frame to produce macroblocks;
determining video data parameters from the partially decoded video frame or both the partially and fully decoded video frame; and
encoding the macroblocks based on the determined video data parameters to provide a compressed video frame for subsequent display, wherein the step of encoding the macroblocks includes:
(i) allocating target encoding bits for each macroblock;
(ii) predicting a quantizer scale for each macroblock;
(iii) implementing control loop feedback; and
(iv) encoding the macroblock based on said video data parameters, wherein predicting the quantizer scale includes an approximation of a rate quantization with a feedback control adjustment, as described by the equation:

$$\tilde{q}_i = \frac{\tilde{X}_i}{s_i^T} + \xi_{MB}$$

where $\tilde{q}_i$ is a predicted quantizer scale for an $i^{th}$ macroblock; $\tilde{X}_i$ is an estimated complexity of the $i^{th}$ macroblock; $s_i^T$ is a target number of bits used for encoding AC coefficients for the $i^{th}$ macroblock; and $\zeta_{MB}$ is a proportional integral control adjustment for the macroblock level.

28. A method according to claim 27, wherein said control loop feedback is based on an error between actual and target encoding bits and provides proportional integral or proportional control adjustments by applying the equation $$\xi_{MB} = \alpha e_{i-1} + \beta \sum_{k=0}^{i-1} e_k$$

to steps of the macroblock bit allocation and quantizer scale prediction, where α and β are constants less than zero and $e_i$ is an error of the $i^{th}$ macroblock, defined as the difference between the target and re-encoded AC coefficient bit counts.

29. A method according to claim 23, wherein said control loop feedback includes a two tier closed control loop with an inner loop controlling quantizer prediction accuracy and an outer loop compensating for bit rate accuracy.

30. A method according to claim 23, wherein said encoding step (iv) comprises the process of forward DCT transformation, quantization and variable length coding based on said video data parameters, which includes the quantizer scale and a subset of one or more of: DCT type, quantizer scale type, intra quantization matrix, intra DC precision, alternate scale and intra variable length coding format.

31. A video decoding system for processing video frame data, comprising:
means for receiving a video frame;
means for partially decoding the video frame;

means for fully decoding the video frame to produce macroblocks;

means for determining video data parameters from the partially decoded video frame or both the partially and fully decoded video frame; and means for encoding the macroblocks based on the determined video data parameters to provide a compressed video frame for subsequent display, wherein the means for determining step include one or more of:

(i) means for determining macroblock-level and picture-level video data parameters;

(ii) means for determining macroblock complexity in the video frame;

(iii) means for determining picture statistics of the video frame; and wherein said picture statistics include DOT type, DC compression factor, picture complexity, a picture bit count of AC coefficients, and a picture bit count of DC coefficients, wherein said picture bit count of DC coefficients is determined as the summed accumulation of bit counts of DC coefficients from intra-coded macroblocks multiplied by the DC compression factor and accumulation of estimated bit count of DC coefficients from the inter-coded macroblocks.

32. A video decoder, comprising:

a bitstream parser for receiving a video frame;

an embedded decoder for partially decoding the video frame and fully decoding the video frame to produce macroblocks;

a data analyzer for determining video data parameters from the partially decoded video frame or both the partially and fully decoded video frame; and an embedded encoder for encoding the macroblocks based on the determined video data, wherein the embedded encoder is structured to:

(i) allocate target encoding bits for each macroblock;

(ii) predict a quantizer scale for each macroblock;

(iii) implement control loop feedback; and (iv) encode the macroblock based on said video data parameters, wherein the allocation of target macroblock encoding bits includes scaling of macroblock complexity relative to picture complexity with a feed back control adjustment, as described by the equation:

$$s_i^T = \frac{\tilde{X}_i}{\tilde{X}_{pic}} * (s_{pic}^T + \xi_{pic})$$

where $s_i^T$ is a target number of bits for encoding AC coefficients for an $i^{th}$ macroblock; $\tilde{X}_i$ is an estimated complexity for the $i^{th}$ macroblock; $\tilde{X}_{pic}$ is an estimated complexity from current picture statistics; $s_{pic}^T$ is a target number of bits for encoding all AC coefficients from current picture statistics; and $\xi_{pic}$ is a proportional integral control adjustment for the picture level.

33. A video decoder system that supports lower resolution picture decoding, comprising:

a video decoder that includes:

a bitstream parser for receiving a video frame;

an embedded decoder for partially decoding the video frame and fully decoding the video frame to produce macroblocks;

a data analyzer for determining video data parameters from the partially decoded video frame or both the partially and fully decoded video frame; and an embedded encoder for encoding the macroblocks based on the determined video data;

a decimation filter module for receiving the decoded macroblocks and performing a horizontal spatial decimation of display pixels to the required resolution using a digital decimation filter; and an interpolation filter module for receiving the decoded macroblocks and performing a horizontal spatial interpolation to achieve a full D1 resolution motion compensation using a digital interpolation filter, wherein the embedded encoder is structured to:

(i) allocate target encoding bits for each macroblock;

(ii) predict a quantizer scale for each macroblock;

(iii) implement control loop feedback; and (iv) encode the macroblock based on said video data parameters, wherein predicting the quantizer scale includes an approximation of a rate quantization with a feedback control adjustment, as described by the equation:

$$\tilde{q}_i = \frac{\tilde{X}_i}{s_i^T} + \xi_{MB}$$

where $\tilde{q}_i$ is a predicted quantizer scale for an $i^{th}$ macroblock; $\tilde{X}_i$ is an estimated complexity of the $i^{th}$ macroblock; $s_i^T$ is a target number of bits used for encoding AC coefficients for the $i^{th}$ macroblock; and $\xi_{MB}$ is a proportional integral control adjustment for the macroblock level.

34. A decoder according to claim 33, wherein the data analyzer is structured to perform averaging operations for the lower resolution picture decoding.

35. A system according to claim 31, wherein the DC compression factor is defined as a picture bit count of DC coefficients of the received video frame divided by a picture bit count of a DC coefficients from re-encoded macroblocks.

36. A system according to claim 31, wherein said picture complexity is determined as one of the sum of macroblock complexities of macroblocks in the video frame and the sum of estimated macroblock complexities of macroblocks in the video frame.

37. A decoder according to claim 32, wherein said predicted quantizer scale is constrained to be above a minimum quantizer scale.

38. A decoder according to claim 32, wherein $\xi_{pic}$ is defined by $$\eta e_{i-1} + \gamma \sum_{k=0}^{i-1} e_k$$

where $\eta$ and $\gamma$ are constants and $e_i$ is an error of the $i^{th}$ macroblocks, defined as the difference between the target and re-encoded AC coefficient bit counts.

* * * * *

UNITED STATES PATENT AND TRADEMARK OFFICE
CERTIFICATE OF CORRECTION

PATENT NO. : 7,366,240 B2
APPLICATION NO. : 10/801983
DATED : April 29, 2008
INVENTOR(S) : Patricia Chiang Wei Yin et al.

It is certified that error appears in the above-identified patent and that said Letters Patent is hereby corrected as shown below:

Column 21
Line 61, "$s_{pic}^{T}$" should read as -- $s^{T}_{pic}$ --

Column 21
Line 63, "$\zeta_{pic}$" should read as -- $\xi_{pic}$ --

Column 22
Line 1, "wherein $\zeta_{pic}$ is" should read as -- wherein $\xi_{pic}$ is --

Column 22
Line 37, "and $\zeta_{MB}$ is a" should read as -- and $\xi_{MB}$ is a --

Column 23
Line 16, "wherein said picture statistics include DOT type," should read as -- wherein said picture statistics include DCT type, --

Column 23
Line 53, "$s_{pic}^{T}$" should read as -- $s^{T}_{pic}$ --

Column 23
Line 55, "$\zeta_{pic}$" should read as -- $\xi_{pic}$ --

Column 24
Line 33, "and $\zeta_{MB}$ is a" should read as -- and $\xi_{MB}$ is a --

UNITED STATES PATENT AND TRADEMARK OFFICE
CERTIFICATE OF CORRECTION

PATENT NO. : 7,366,240 B2
APPLICATION NO. : 10/801983
DATED : April 29, 2008
INVENTOR(S) : Patricia Chiang Wei Yin et al.

It is certified that error appears in the above-identified patent and that said Letters Patent is hereby corrected as shown below:

Column 24
Line 51, "wherein $\zeta_{pic}$ is" should read as -- wherein $\xi_{pic}$ is --

Signed and Sealed this

Twenty-eighth Day of October, 2008

JON W. DUDAS
*Director of the United States Patent and Trademark Office*